United States Patent [19]

Chaintreuil

[11] Patent Number: 4,875,250
[45] Date of Patent: Oct. 24, 1989

[54] CLAMP FOR FASTENING A CARPET ON A FLOOR

[75] Inventor: René Chaintreuil, Audincourt, France

[73] Assignees: Automobiles Peugeot; Automobiles Citroen, both of Paris, France

[21] Appl. No.: 259,512

[22] Filed: Oct. 18, 1988

[30] Foreign Application Priority Data

Oct. 20, 1987 [FR] France ................................ 87 14460

[51] Int. Cl.⁴ .............................................. A47G 27/04
[52] U.S. Cl. ................................................. 16/4; 16/6;
  16/7; 16/8; 24/295; 24/350; 24/355; 24/710.8
[58] Field of Search ........................ 16/4, 5, 6, 7, 8, 9,
  16/10, 16; 24/294, 295, 350, 355, 710.8

[56] References Cited

FOREIGN PATENT DOCUMENTS

| 124540 | 1/1946 | Australia ............................... 24/295 |
| DE-B- 1120908 | 12/1961 | Fed. Rep. of Germany . |
| FR-A- 1178895 | 5/1959 | France . |
| FR-A- 1384230 | 11/1964 | France . |
| GB-A-779 866 | 7/1957 | United Kingdom . |

Primary Examiner—Richard K. Seidel
Assistant Examiner—Edward A. Brown
Attorney, Agent, or Firm—Kenyon & Kenyon

[57] ABSTRACT

A clamp for fastening a carpet onto a floor, comprising two members spaced from each other in a vertical plane and including one claw directed upwards for one member and downwards for the other member to allow the insertion and catching of two sides of a carpet onto the clamp before the clamp is clipped onto a flange-like edge.

8 Claims, 1 Drawing Sheet

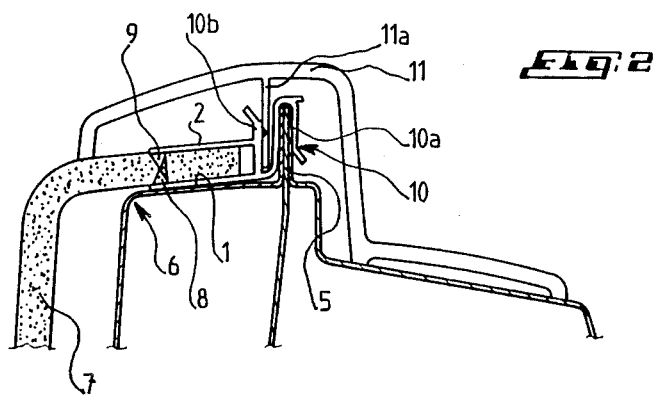
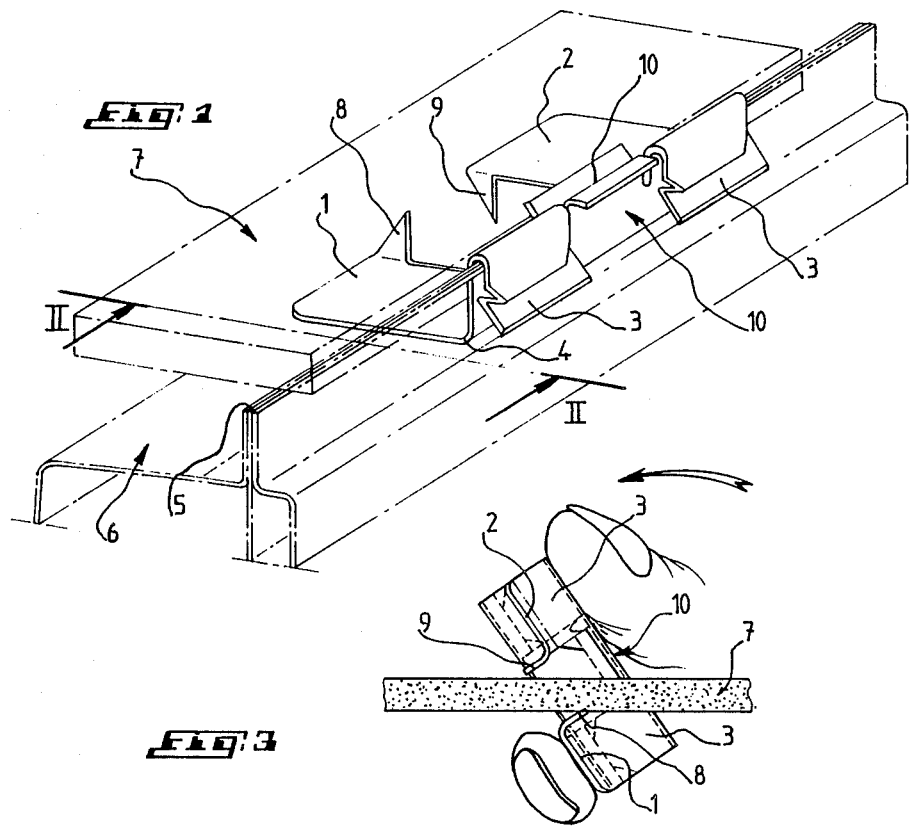

CLAMP FOR FASTENING A CARPET ON A FLOOR

BACKGROUND OF THE INVENTION

The present invention relates generally to clamps and is more particularly directed to a clamp for fastening a more or less rigid element such as for instance a carpet or a like ground cover on a surface such as for instance a vehicle floor.

To fasten a carpet on a vehicle floor there has already been proposed various kinds of fasteners made from plastics material or from metal which often require the flange of the side frame or girder which extends on the sides of the vehicle floor to be drilled through. It is obvious that the drilling step requires time, is detrimental to the fluid-tightness and is not desirable.

There has also been proposed clamps made from metal or from plastics material which are clipped onto the flange of the side frame or girder but which do not make possible a satisfactory and firm fastening of the carpet onto the vehicle floor, which carpet is of course constantly acted upon by the feet of the drivers and the passengers.

There are thus known clamps or clips made from spring steel, comprising a first portion folded back on itself and adapted to be clipped onto the flange and a second portion connected substantially at right angles to the first portion and adapted to retain the carpet on the floor.

SUMMARY OF THE INVENTION

The object of the present invention is to remove the inconveniences of the clamps or clips of the prior art by providing a clamp or a clip requiring no previous drilling for making possible the fastening of the carpet, nor any possible gluing of this carpet and providing a very firm fastening without any risk of slip of the carpet on the vehicle floor.

For this purpose the invention is directed to a clamp or a clip for fastening an element such as a carpet or like cover onto a surface such as a vehicle floor, the clamp includes a first portion folded back on itself and adapted to be clipped onto an edge forming a flange and a second portion connected substantially at right angles to the first portion and adapted to retain the element to be fastened onto said surface, said second portion including at least two members spaced from each other or offset in the vertical plane and each member comprising at least one claw, tooth or the like directed upwards for one of the members and downwards for the other one so as to allow the insertion and catching through its two faces of the element or carpet to be fastened onto the clamps prior to its being clipped.

According to a further embodiment of this clamp, both aforesaid members are spaced from each other or offset in the horizontal plane and connected to each other through a bridging portion.

This bridging portion is folded back on itself and has substantially an S-shaped cross section forming two inverted clips for allowing the holding, by the bridge portion being clipped, onto the aforesaid edge and the holding of an element that forms a trimming or a fitting section.

It should be pointed out that a clamp according to the present invention may be provided with an operating device such as a handle or grip.

The claw or claws belonging to each aforesaid member are preferably made by simple folding of the members.

BRIEF DESCRIPTION OF THE DRAWINGS

Further characterizing features and advantages of the invention will appear more clearly in the following detailed description with reference to the accompanying drawings given by way of example only and wherein:

FIG. 1 is a prospective view of a clamp according to the invention and of its mounting on a flange-like edge;

FIG. 2 shows a view in cross section taken upon the line II—II of FIG. 1; and

FIG. 3 illustrates the mounting of the clamp on a carpet before its being clipped onto the flange.

DETAILED DESCRIPTION

According to an exemplary embodiment and referring more particularly to FIG. 1 there is seen that a clamp according to the present invention can be made from spring steel and consists essentially of two members 1, 2 spaced from each other or offset in the vertical plane and connected substantially at right angles as shown at 4 to a portion 3 folded back on itself and adapted to be clipped onto a flange-like edge 5 constituting, to some extent, a girder or like beam which extends along a vehicle surface 6, covered by a carpet or moquette 7.

The vertically spaced members 1 and 2 each include comprise a claw or the like 8, 9 which is directed upwards with respect to member 1 and which is directed downwards with respect to member 2.

The members 1 and 2 are offset not only vertically but also in the horizontal plane as is well illustrated by FIG. 1, the connection of both members being provided by a bridging portion 10.

This portion 10, as better seen in FIG. 2, is folded back on itself and exhibits in cross-section substantially the shape of an S which forms two inverted clips. One of these clips 10a allows, as is illustrated by FIG. 2, the bridge portion 10 to be retained through clipping onto the flange 5 exactly as the folded back portions 3, whereas the other clip 10b allows a trimming or fitting section 11 to be retained with its portion 11a, which section covers the clamps for fastening the carpet 7 along the flange 5.

The vertically offset members 1 and 2 could well be located above one another and not be offset or staggered in the horizontal plane without leaving the scope of the invention. Likewise the claws 8 and 9 belonging to the members 1 and 2, respectively, could be made otherwise than through folding back offset members as shown on FIG. 1.

The clamp just described could comprise an operating handle (not shown) to facilitate the conveyance and handling of the carpet 7 before its being fastened through clipping onto the flange 5.

For a better understanding of the invention the mounting and the advantages of the clamp will be described hereinafter with reference more particularly to FIG. 3.

At first the edge of the carpet 7 should be inserted between both members 1 and 2 as seen on FIG. 3, and then with the help of fingers the clamp should be turned so that the members 1 and 2 become parallel to the carpet thereby allowing the claws or teeth 8 and 9 to bite into both sides of the carpet 7.

With this connection thus carried out it is possible to easily handle the carpet 7 which is secured by several clamps and to easily fasten it by clipping the portions 3 and 10 onto the flange 5.

There has thus been provided according to the invention a clamp which does not require any previous drilling through the metal sheeting and through the carpet thereby solving the problems of fluid-tightness and which provides a firm holding of the carpet onto the floor after the mounting, i.e. which does not result in any gaping or slip of the carpet 7 with respect to the floor since the carpet after having been fastened would be firmly hooked on both sides to the claws 8, 9 of the clamp itself which is secured through clipping onto the flange 5.

It should be understood that the present invention is not at all limited to the embodiment described and illustrated which has been given by way of example only.

Such a clamp could be used with carpets or moquettes of various natures and thicknesses and the clamp could comprise more than two members such as 1 and 2.

The invention therefore comprises all the technical equivalents of the means described as well as their combinations if same are carried out according to its gist and within the scope of the appended claims.

What is claimed is:

1. A clamp for fastening an element such as a carpet or the like onto a surface such as a vehicle floor, comprising a first portion folded back on itself and adapted to be clipped onto an edge forming a flange and a second portion, connected to the first portion, adapted to retain said element onto said surface, wherein the improvement comprises said second portion being connected at right angles to the first portion and said second portion including at least two members spaced or offset from each other in both a first plane and in a second plane substantially perpendicular to said first plane and said members being connected to each other through a bridging portion.

2. A clamp according to claim 1, wherein said bridging portion is folded back on itself and exhibits a substantially S-shaped cross-section forming two inverted clips allowing the bridging portion to be retained onto said flange by one of said inverted clips and retaining an element forming a trimming section by the other of said inverted clips.

3. A clamp according to claim 1, further comprising a handle.

4. A clamp according to claim 1, wherein each member comprises a portion folded back to form a claw.

5. A clamp assembly for retaining an element in a positional relationship to a surface and an edge comprising:
   a first member;
   a first portion, connected at right angles to said first member, said first portion including a subportion folded back on itself and forming a clip adapted to be attached to the edge;
   a second member;
   a second portion, connected at right angles to said second member, said second portion including a second subportion folded back on itself and forming a clip adapted to be attached to the edge;
   a bridging portion connecting said first and second portions and being folded back on itself forming two inverted clips, a first inverted clip adapted for fastening to the edge; and
   a trimming section having a retaining portion adapted to be held by the second inverted clip and covering the first and second members.

6. The clamp of claim 5 wherein said first and second portions comprise spring steel.

7. The clamp of claim 5 wherein said first member includes a section folded back to form a first claw and said second member includes a second section folded back to form a second claw.

8. The clamp of claim 7 wherein said first member is vertically offset with respect to said second member and wherein said first and second claws have gripping portions parallel to one another but extending in opposite directions.

* * * * *